US007089484B2

(12) United States Patent
Chan et al.

(10) Patent No.: US 7,089,484 B2
(45) Date of Patent: Aug. 8, 2006

(54) DYNAMIC SPARING DURING NORMAL COMPUTER SYSTEM OPERATION

(75) Inventors: Kenneth Y. Chan, Hopewell Junction, NY (US); Henry Chin, Pittsburgh, PA (US); Judy Shan-Shan Chen Johnson, Poughkeepsie, NY (US); Kevin W. Kark, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 10/277,201

(22) Filed: Oct. 21, 2002

(65) Prior Publication Data

US 2004/0078653 A1    Apr. 22, 2004

(51) Int. Cl.
    *G06F 11/08*    (2006.01)
(52) U.S. Cl. ............................. 714/797; 714/11; 714/6
(58) Field of Classification Search ................ 714/797, 714/11, 6
See application file for complete search history.

(56) References Cited

U.S. PATENT DOCUMENTS

| 3,665,173 | A | * | 5/1972 | Bouricius et al. .............. 714/11 |
| 3,783,250 | A | * | 1/1974 | Fletcher et al. ................ 714/11 |
| 4,794,601 | A | * | 12/1988 | Kikuchi ....................... 714/758 |
| 4,914,657 | A | * | 4/1990 | Walter et al. ................... 714/4 |

* cited by examiner

*Primary Examiner*—Joseph Torres
(74) *Attorney, Agent, or Firm*—Lynn L. Augspurger

(57) ABSTRACT

A computer system enabling dynamic sparing employs a standby component which is identical to three other additional components and which operates like these other three active components while the computer system is running. Any one of these three other active components can be spared out dynamically in the computer system while it is running using a result of voting scheme and connecting of these four components in such a way that the system can dynamically spare while the system is still in operation. Such dynamic sparing gives the system a better reliability and availability when compared to today's computer system.

8 Claims, 2 Drawing Sheets

Dynamic Sparing due to Multiple_Error(ME) Block Diagram

DYNAMIC SPARING DURING NORMAL COMPUTER SYSTEM OPERATION

FIELD OF THE INVENTION

This invention relates to computer systems, including network system, and particularly to invoking a spare component dynamically while the system is still running.

Trademarks: IBM® is a registered trademark of International Business Machines Corporation, Armonk, N.Y., U.S.A.. Other names may be registered trademarks or product names of International Business Machines Corporation or other companies.

BACKGROUND

In order to enhance the reliability and availability of a computer system, including network systems, it is desirable to invoke a spare component dynamically while a system is still running. The dynamic sparing feature for IBM's current computer systems is increasingly more important in a computer system designed to satisfy customers' demands of zero down time in a fault tolerance design having minimal service interruption. A self-healing system is desirable.

In the enduring prior art, the one currently still used by IBM is the technique long known as hardware Triple-Modular-Redunancy(TMR)/Sparing which was based on a voting result occurring after recognizing and locating the failure of an active logic module and then reconfiguring the system by invoking a sparing action using a combination of a current masking-type error detection with standby redundancy type correction techniques. This technique was described in the original IBM U.S. Pat. No. 3,665,173 issued May 23, 1972 entitled "Triple Modular Redundancy/Sparing" invented by Willard Bouricius, William Carter, John Roth and Peter Schneider of IBM, which is incorporated herein by reference.

SUMMARY OF THE INVENTION

In accordance with the preferred embodiment the computer system having dynamic sparing during normal computer system operation a spare component is invoked dynamically while the system is still running. The computer system utilizes an active standby spare component which is identical to three other active components, and the active spare component is used to replace one of the three active components in response to the result of a voting scheme. The voting scheme uses the steps implemented in the current and patented Triple-Module-Redunancy(TMR) technique described above to detect any error. Once an ME (multiple_error) is detected such that the output data of one of the three components is mismatched with the other two components and the data of all three components has good parity, a new failing decodes value is created for this ME. Once the failings decode value is detected, then the corresponding gate of the decode value switches the spare component in to replace the failing component, instead of using the prior art removal of an ME, which is a more severe mode of a failing logic state, which requires immediate attention.

In accordance with the present invention a spare component is invoked dynamically while the computer system is in operation. This invention also utilizes counters to keep track of correctable error (i.e. a less severe case of a failing logic state) by having error counters for each active component. When a single bit error or correctable error is detected, the corresponding counter is incremented. If the counter reached a threshold, the software can then write the failing decode value to the spare vector register. Then the spare component will replace the failing component once the spare vector is in place.

In the system of the present invention, there are four identical active components installed into the computer system, which term includes a network system. In the preferred embodiment of the invention, one of the components is selected as an active standby component which doesn't participate in the voting scheme during the normal system operation. This spare component is still functional like the other three components. These three active components are connected to the voting logic that is detected any error of these three components. If one of the three active components is out voted by other two components, then a ME (Multiple Error) code is generated. Base on this ME code, the decode function identifies a failing component. The corresponding gate will activate the standby spare component to replace the failing component which has participated in the voting scheme. The replacement of this failing component is done dynamically while the system is running.

We also provide three error counters to monitor each voting result of each component. If the voting result is a correctable error or ME, the corresponding counter to the corresponding component is incremented. When the count exceeds a threshold level for a given component, the software will determine a failing decode value based on the corresponding counter. Then the software will first examine the sparing status register to determine the spare is invoked or not. Once the software determines the hardware didn't invoke the spare, the software will set the disabled hardware spare bit on and read out the sparing status register out again to assure the hardware didn't invoke the sparing while the software was checking the status. The software will write the spare vector into the spare vector register. The spare will replace the failing component once the spare vector register is loaded with the spare vector.

These and other improvements are set forth in the following detailed description. For a better understanding of the invention with advantages and features, refer to the description and to the drawings.

Our detailed description explains the preferred embodiments of our invention, together with advantages and features, by way of example with reference to the drawings.

DETAILED DESCRIPTION OF THE INVENTION

Figure 1:
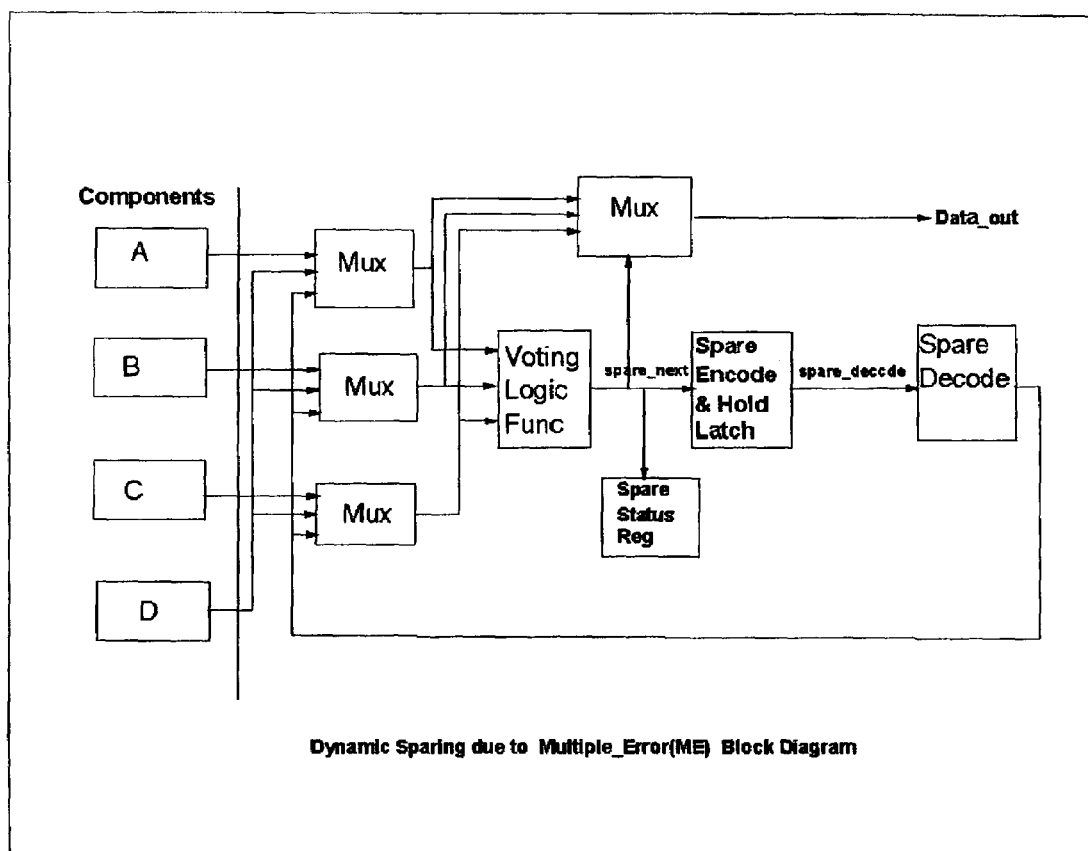
FIG. 1 is a block diagram illustrating a system in which the present invention is employed.
Figure 2:
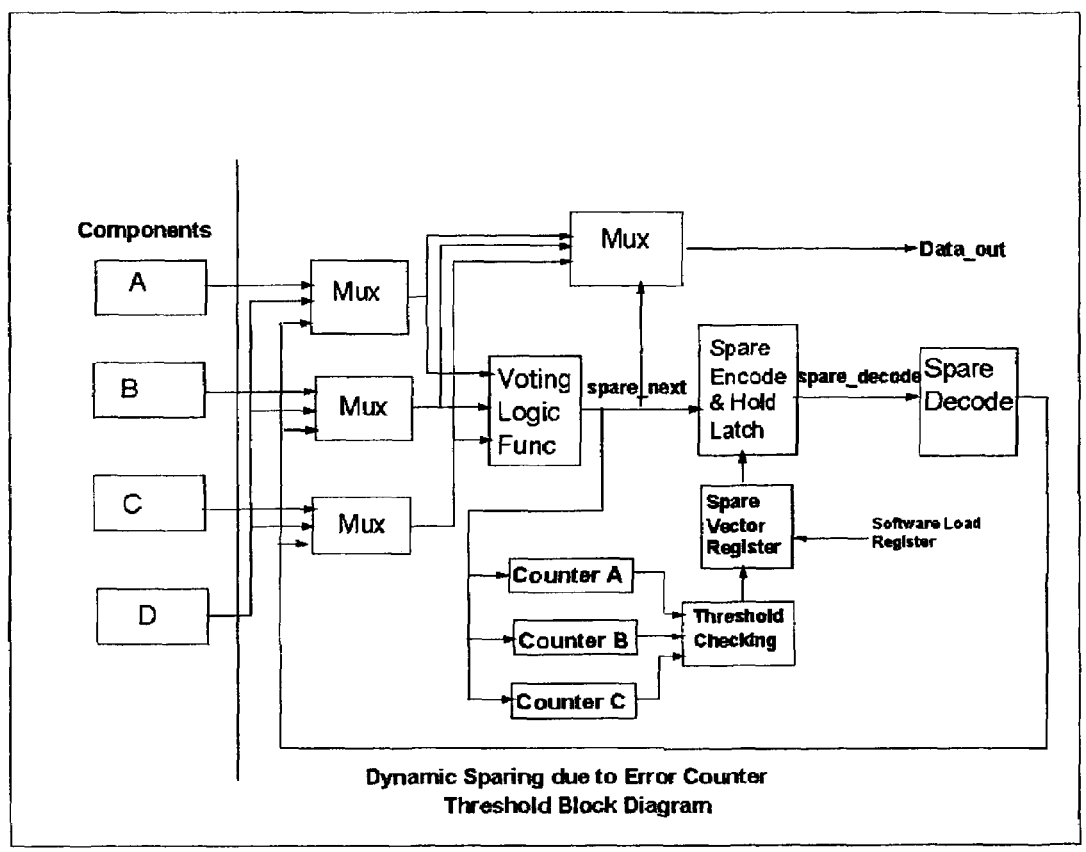
FIG. 2 is the block diagram of dynamic sparing with error counters due to the correctable error.

As shown in FIG. 1, the block diagram is shown of a computer system, which includes network systems, that has the illustrated four components that are always executing with the identical data from the system. Basically, four components being multiplexed into a TMR but only three out of four components participate in the voting logic, while all four components are identical and can be operating synchronously with respect to each other, (i.e. has identical inputs, outputs and function). The fourth component is active and in sync with the other three active components. The fourth one does not participate the three way voting until the corresponding gate is activated. Each active components assigned an ID code and a spare decode value is pointed to for each corresponding component. Base on these decode values, the corresponding gate will select the spare to replace the failing component.

As illustrated in FIG. 1, there are three components which we have given an ID named A, B and C and a spare copy named D. The outputs of the three components (A, B, & C) are connected to three separate multiplexers. The D component of the computer system is connected to all three inputs of the multiplexers. All three outputs of the multiplexers are connected to the triple modular redundancy TMR unit including the voting logic function for error checking.

The default output of the multiplexers come from the three active components, A, B and C. If the outputs of these three components are matched and have a good parity, then all three components are considered good. However, if one of the three active components A,B and C doesn't match with the other two components, then the mismatched result generates an error indication in the form of a ME(Multiple_Error) code which is recognized as a sever error to the system; and in response the decode function of the computer system will generate a corresponding gate select for the component D to replace the failing component. At the same time the decode value will be saved into a spare status register. This marks the completion of sparing due to the generated ME.

The value of the sparing decode is the follow:
1. Spare_next(0)=spare_next_gate and (decode_me(1) or decode_me(2));
2. Spare_next(1)=spare_next_gate and (decode_me(0) or decode_me(2));

The spare_next value is generated based on the decode_me bits which is the result of the voting scheme. The spare_next_gate is to gate the result of the voting scheme out to the input of the spare encode function. The encode function then generates the spare_decode bit which is decoded as the following:
1. A=spare_decode(0:2)="010"
2. B=spare_decode(0:2)="100"
3. C=spare_decode(0:2)="110"

The corresponding spare gate is set with the following conditions:
1. the hardware sparing is not disable
2. an first ME is detected
3. the spare component is available.

The spare decode will enable the corresponding gate to replace the failing component with the sparing component. The spare component will be activated. The spare component will replace the failing component. If there is a bad spare component detected during the system power on, the software will set the spare_decode(0:2) to "001". This will mark the spare component is bad. Once the spare component is marked, then the hardware can't invoke the sparing. The spare status will save to the sparing status latch.

There are four error counters to monitor any correctable error. During normal system operation, three error counters corresponding the three active components. However, all four components are active with normal execution with the same copy of data. The outputs of three active components are connected to the TMR for error checking. The types of error are correctable error, or Multiple_Error (ME). The ME is one of the components out-voted by other two components. The error counters will increment when any correctable error or ME is detected from the TMR. Therefore, a corresponding error counter is incremented to the corresponding failing component. The software can examine any counters periodically to determine whether the counters have reached the predetermined threshold value. If any counter has reached the threshold level, the software can issue a spare operation. First, the software will examine all three error counters to determine which counter have reached the threshold level. Second, the software will set a disabled hardware spare bit and read out the spare status register to determine the spare component is already invoked by the hardware. If the software read back the spare status is all zero that indicates the spare component is available, then the spare vector will be written into the sparing vector register. Once the sparing vector is in place, the failing component will be logically replaced immediately. This marks the completion of sparing via software.

It will be seen that the preferred embodiment represents a significant change from what has been done for so long a time.

In accordance with the invention, using key sparing, a component counter is checked to determine if a threshold is overflowed. In such event, a spare bit is set in the disable spare hardware register. The spare vector status bit is check to be sure that the hardware spare had not occurred. The spare vector register is set to select which key is going to spare out, and when the spare vector is set the spare component is active. This is a very quick process.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamic sparing during normal computer system operation, comprising the steps of:

using four identical active components, such that data from any one of the active components may or may not have a good parity at any particular cycle of said computer system operation, installed in said computer system having voting logic executing a voting scheme, and selecting one of said components to function as an active standby component which doesn't participate in the voting scheme during the normal system operation and yet said active standby component is still functional like the other active components and capable of sparing another active component, said other three active components being used if the outputs of these three active components are matched and have good parity while connected to system voting logic that detects any error of these three components and executes said voting scheme whereby, upon detection of a mismatch and a determination that data in all three components has good parity, one of the other three active components is out voted by any two active components of the other three active components, and then generating a ME (Multi_bit Error) code for said computer system, based on said ME code, to identify a failing component with a decode function for said ME code, wherein once a failing component decode value is detected for said ME code, then a corresponding gate for a decode switches said active standby component in to replace a failing component for dynamically activating said active standby component with a corresponding gate which causes said standby spare component to replace the failing component which has participated in said voting scheme, said replacement of said identified failing component being done dynamically while the computer system is running in operation to spare said identified failing component without removal of said ME code with said active standby component, and wherein three error counters are employed to monitor each voting result of each active component in the three voting scheme, and if a voting result is a correctable error or ME, a corresponding counter to the corresponding component is incremented, and when the count for said corresponding counter exceeds a threshold level for a given component, computer system software will determine a failing decode value based on the corresponding counter and wherein, after said count for said corresponding counter exceeds a threshold level for a given component and said failing decode value is determined, then the computer system software will first examine by reading a sparing status register to determine whether said selected active standby component is invoked or not, and when said software determines the computer system didn't invoke the spare, said software will set a disabled hardware spare bit on and read the sparing status register again to be assured the computer system didn't invoke sparing of said active standby component while the software checking the status.

2. The method according to claim 1, wherein said computer system software will write a spare vector into a spare vector register after becoming assured that the computer system didn't invoke sparing of said active standby component which the software was checking the status, and then said active standby component will spare and replace the failing component once the spare vector register is loaded with said spare vector's value.

3. The method according to claim 1, wherein said four active components are multiplexed into triple modular redundancy logic of said computer system, but only three out of four components are participating in the voting logic while all four components are operating synchronously with respect to each other, having identical inputs, outputs and function.

4. The method according to claim 3 wherein while said fourth component is active and in sync with the other three active components, said fourth component when selected as an active standby component is not participating in any the three way voting until a sparing activation gate is activated whereupon based upon spare decode values, the corresponding gate be said sparing activation gate and will select the spare to replace the failing component.

5. The method according to claim 1 wherein four error counters are connected to the said four components as said error counters keep track of the correctable error counts as well as the ME counts.

6. The method according to claim 5, wherein said error counters are monitored to determine when said error counters have reached a threshold level, and computer system software can set a spare vector value to the spare vector register, whereupon, once said spare vector is set, the active standby component will become a spare active component and will replace the failing component.

7. The method according to claim 1 wherein said system voting logic that detects any error of these other three active components and executes said voting scheme will switch to the spare component dynamically and instantaneously if the ME did occur so that it is transparent to the system.

8. The method according to claim 1 wherein said the system voting logic that detects any error of these other three active components and executes said voting scheme supports the sparing function upon a hard error and upon correctable error using a programable threshold value as a threshold level for a given component.

* * * * *